US012750388B2

(12) United States Patent
Taneja et al.

(10) Patent No.: US 12,750,388 B2
(45) Date of Patent: Sep. 29, 2026

(54) SYSTEM AND METHOD FOR IMPROVING API MANAGEMENT, GOVERNANCE, AND SECURITY UTILIZING FEDERATED SCHEMAS AND ADAPTIVE SWARM INTELLIGENCE

(71) Applicant: Bank of America Corporation, Charlotte, NC (US)

(72) Inventors: Pushkar Taneja, Hyderabad (IN); Suryanarayana Adivi, Hyderabad (IN); Jemlin Lucas, Coppell, TX (US)

(73) Assignee: Bank of America Corporation, Charlotte, NC (US)

( * ) Notice: Subject to any disclaimer, the term of this patent is extended or adjusted under 35 U.S.C. 154(b) by 32 days.

(21) Appl. No.: 19/044,043

(22) Filed: Feb. 3, 2025

(65) Prior Publication Data

US 2026/0230484 A1 Aug. 6, 2026

(51) Int. Cl.
*H04L 29/06* (2006.01)
*G06F 9/54* (2006.01)
*H04L 9/40* (2022.01)
*H04L 29/08* (2006.01)

(52) U.S. Cl.
CPC .......... *H04L 63/1425* (2013.01); *G06F 9/547* (2013.01); *H04L 63/1441* (2013.01)

(58) Field of Classification Search
CPC ............................. G06F 9/547; H04L 63/1441
USPC ............................................................. 726/1
See application file for complete search history.

(56) References Cited

U.S. PATENT DOCUMENTS

| | | | |
|---|---|---|---|
| 9,143,392 | B2 | 9/2015 | Duchesneau |
| 9,454,294 | B2 | 9/2016 | Sapuram et al. |
| 9,813,318 | B2 | 11/2017 | Iyoob et al. |
| 9,818,127 | B2 | 11/2017 | Ilyas et al. |
| 9,824,390 | B2 | 11/2017 | Adapalli et al. |
| 9,832,205 | B2 | 11/2017 | Santhi |
| 10,013,314 | B2 | 7/2018 | Klose |
| 10,467,426 | B1 | 11/2019 | Esposito et al. |
| 10,491,638 | B2 | 11/2019 | Narayanaswamy et al. |
| 10,826,940 | B2 | 11/2020 | Narayanaswamy et al. |
| 10,965,547 | B1 | 3/2021 | Esposito et al. |
| 11,126,481 | B2 | 9/2021 | Maes et al. |
| 11,372,992 | B2 | 6/2022 | Mikhailov et al. |
| 11,803,893 | B2 | 10/2023 | Gupta et al. |
| 11,995,130 | B2 | 5/2024 | Przada et al. |
| 12,182,598 | B1 * | 12/2024 | Johnson .................... G06F 8/60 |
| 12,388,826 | B2 * | 8/2025 | Gundlagutta ........... H04L 63/10 |

(Continued)

*Primary Examiner* — Haresh N Patel

(57) ABSTRACT

A system includes a memory configured to store a software application and a plurality of application programming interfaces (APIs) associated with the software application and a processor operably coupled to the memory. The processor is configured to receive, by a single federated gateway, a request to execute an interaction with the software application to satisfy the request, partition the request into at least a first subsidiary request and a second subsidiary request based on a content of the request, route the first subsidiary request to a first API and first set of independent software services and the second subsidiary request to a second API and second set of independent software services, and receive, by the single federated gateway, the first subset of data and the second subset of data. The processor is further configured to generate a response and provide the response to a computing device.

20 Claims, 3 Drawing Sheets

(56) References Cited

U.S. PATENT DOCUMENTS

| | | | |
|---|---|---|---|
| 2020/0026710 A1 | 1/2020 | Przada et al. | |
| 2023/0342344 A1* | 10/2023 | Brown | G06F 16/2255 |
| 2024/0061817 A1* | 2/2024 | Sagar | G06F 16/211 |
| 2024/0273097 A1* | 8/2024 | Sukumar | G06F 16/211 |
| 2024/0323233 A1 | 9/2024 | Narayanaswamy et al. | |
| 2024/0340227 A1 | 10/2024 | Nanduru et al. | |
| 2024/0419771 A1* | 12/2024 | Nussbaum | G06F 21/41 |
| 2025/0045094 A1* | 2/2025 | Newburn | G06F 9/485 |
| 2025/0061141 A1* | 2/2025 | Neervannan | G06F 16/3344 |
| 2026/0004055 A1* | 1/2026 | Katta | G06F 40/169 |
| 2026/0012353 A1* | 1/2026 | Elmenshawy | H04L 9/3247 |
| 2026/0025385 A1* | 1/2026 | Nagaraja | H04L 63/0815 |

* cited by examiner

SYSTEM AND METHOD FOR IMPROVING API MANAGEMENT, GOVERNANCE, AND SECURITY UTILIZING FEDERATED SCHEMAS AND ADAPTIVE SWARM INTELLIGENCE

TECHNICAL FIELD

The present disclosure relates generally to computing security, and, more specifically, to a system and method for improving application programming interface (API) management, governance, and security utilizing federated schemas and adaptive swarm intelligence.

BACKGROUND

Certain web-based environments may include data stored across any number of databases and associated with any number of entities. For example, the data may include various user data or service data that may be stored to databases associated with respective entities, and that user data or service data may be accessed by any number of centralized or decentralized servers for servicing applications associated with various users. However, such web-based environments may be sometimes subjected to various threats and cyberattacks.

SUMMARY

The system and methods implemented by the system as disclosed in the present disclosure provide technical solutions to the technical problems discussed above by improving application programming interface (API) management, governance, and security utilizing a single federated gateway and adaptive swarm intelligence. The disclosed system and methods provide several practical applications and technical advantages. Specifically, the present embodiments improve the security, reliability, and maintainability of software applications, services, and sensitive user data, as well as the one or more processors and memory and databases on which the software applications, services, and sensitive user data may be executed and stored.

Application programming interface (API) sprawl may be used to describe the unbridled proliferation of APIs across a large software system. Specifically, API sprawl may occur when different developers or software development teams within the same organization, for example, each create their own respective APIs to service their particular services or microservices without proper management, governance, and security. This often results in the software system having a large number of decentralized, unmanaged, and unsecured APIs, which—if left to continue proliferating—may lead to various software application and services vulnerabilities, such as potential data leaks or software application and service outages.

For example, one such vulnerability associated with API sprawl may be the potential for redundant and duplicate APIs each having their own security policies, which may often contradict or interfere with each other. Another such vulnerability associated with API sprawl may be the potential for unauthorized access to sensitive user data or business data. For example, many APIs provide access to sensitive user data or business data, and thus by having so many decentralized, unmanaged, and unsecured APIs, the potential for a cyberattack via even one such vulnerable API may provide attackers a conduit to gain unauthorized access to sensitive user data or business data across the software system.

Accordingly, the present embodiments are directed to systems and methods for improving application programming interface (API) management, governance, and security utilizing a single federated gateway and adaptive swarm intelligence. Specifically, in accordance with the presently disclosed embodiments, a federated API gateway and governance and management system is provided for unifying a large number of APIs and database connections behind a single federated gateway (e.g., a single endpoint or a single entry point), which maps to each of a large number of APIs and independent software services associated therewith to fetch, process, and aggregate data from one or more appropriate APIs and associated independent software services (e.g., backend services, microservices) into a single response to a single user request or query that may be submitted to a frontend application. For example, in particular embodiments, the single federated gateway may include a single federated graph query language (GraphQL) gateway that may be utilized to generate a schema (e.g., a map or a graph) corresponding to each of the large number of APIs and a respective set of independent software services (e.g., backend services, microservices) associated with each of the large number of APIs.

In particular embodiments, in response to a single request or query that may be submitted by a user to a frontend application, the single federated GraphQL gateway may then partition the single request or query into different API subsidiary requests based on the content of the single request or query. The single federated GraphQL gateway may then route each of the subsidiary requests to an API and a respective set of independent software services (e.g., backend services, microservices) suitable for fetching and transferring a subset of data responsive to the respective subsidiary request. In particular embodiments, the single federated GraphQL gateway may then aggregate the subsets of data fetched and transferred from the respective APIs and associated sets of independent software services into a single response and provide the single response to the single request or query.

In particular embodiments, the federated API gateway and governance and management system may further include a blockchain-based smart contract system, an adaptive swarm intelligence (ASI) system, and a governance and remediation system. For example, in particular embodiments, the single federated GraphQL gateway may execute an adaptive swarm intelligence (ASI) algorithm to intelligently and efficiently route each of the subsidiary requests to an API and a respective set of independent software services (e.g., backend services, microservices) suitable for fetching and transferring a subset of data responsive to the respective subsidiary request.

For example, in one embodiment, the adaptive swarm intelligence (ASI) algorithm may be suitable for intelligently and dynamically adapting data routes in accordance with changes to network data traffic and conditions by way each of a number of autonomous agents (e.g., "swarms" of compute agents) independently monitoring and tracking data flows associated with each of the large number of APIs and independent software services associated therewith. Based on their respective monitoring and tracking of the large number of APIs and associated independent software services, the number of autonomous agents (e.g., "swarms" of compute agents) may direct or redirect data traffic to one or more other suitable APIs and associated independent software services whenever appropriate thus allowing the single federated GraphQL gateway to fetch, process, and transfer high volumes of sensitive data.

In particular embodiments, in response to user requests or queries for particular interactions, the single federated GraphQL gateway may execute each particular interaction by executing a blockchain-based smart contract to prevalidate the particular interaction in real-time or near real-time and securely on a distributed ledger. In particular embodiments, the single federated GraphQL gateway may further monitor the large number of APIs for anomalies or vulnerabilities and execute real-time or near real-time remediations of vulnerable APIs and/or the respective set of independent software services (e.g., backend services) associated therewith in accordance with a predetermined set of API governance policies.

In this way, the present embodiments may improve the security, reliability, and maintainability of software applications, services, and sensitive user data, as well as the one or more processors and memory and databases on which the software applications, services, and sensitive user data may be executed and stored. Specifically, by providing a federated API gateway and governance and management system in which a single federated GraphQL gateway serves a single endpoint or a single entry point to a large number of APIs of a software system, the present embodiments may preclude any occurrence of redundant and duplicate APIs each having their own independent and siloed security policies. Instead, the single federated GraphQL gateway implements a predetermined set of API governance policies, which manages, governs, and secures each of a large number of APIs from a single endpoint, and thus increases software system security and reduce processing workloads of the one or more processors.

Additionally, by the single federated GraphQL gateway utilizing an adaptive swarm intelligence (ASI) algorithm suitable for dynamically adapting data routes in accordance with changes to network data traffic and conditions, the present embodiments may reduce unnecessary calls or queries to the memory and databases into which sensitive data may be stored, and may thereby reduce memory capacity and improve computer network efficiency, bandwidth, and data throughput. Moreover, by the single federated GraphQL gateway monitoring each a large number of APIs for anomalies or vulnerabilities and executing real-time or near real-time remediations of vulnerable APIs and/or the associated set of independent software services (e.g., backend services), the present embodiments may in real-time or near real-time preclude potential cyberattacks to vulnerable APIs, and thereby increase software system security.

The present embodiments are directed to systems and methods for improving application programming interface (API) management, governance, and security utilizing a single federated gateway and adaptive swarm intelligence. In particular embodiments, a system includes a memory configured to a memory configured to store a software application and a plurality of application programming interfaces (APIs) associated with the software application. For example, in one embodiment, each of the plurality of APIs may include a set of independent software services configured to fetch and process user data. In another embodiment, the plurality of APIs may include a sprawl of APIs each corresponding to one or more disparate software services, and further each software service may be configured to fetch and process user data associated with one or more of a plurality user profiles associated with at least one user.

In particular embodiments, the system further includes a processor operably coupled to the memory and configured to receive, by a single federated gateway, and from a computing device, a request to execute an interaction with the software application to satisfy the request, wherein the single federated gateway includes a schema of each of the plurality of APIs and the respective set of independent software services associated therewith. In particular embodiments, the processor may be further configured to partition the request into at least a first subsidiary request and a second subsidiary request based on a content of the request.

In particular embodiments, the processor may be further configured to route the first subsidiary request to a first API and first set of independent software services and the second subsidiary request to a second API and second set of independent software services. The first API and first set of independent software services is configured to fetch and transfer to the single federated gateway a first subset of data responsive to the first subsidiary request. The second API and second set of independent software services is configured to fetch and transfer to the single federated gateway a second subset of data responsive to the second subsidiary request.

In particular embodiments, the processor may be further configured to receive, by the single federated gateway, and from the first API and first set of independent software services and the second API and second set of independent software services, the first subset of data and the second subset of data. In particular embodiments, the processor may be further configured to generate, based at least in part on the first subset of data and the second set of data, a response to the request to execute the interaction with the software application and in response to the execution of the interaction with the software application, provide to the computing device the response.

In particular embodiments, the processor may be further configured to execute, based at least in part on the queried API, the single federated gateway. For example, in particular embodiments, the single federated gateway may be configured to route the request to the respective sets of independent software services to initiate the execution of the interaction with the software application. In particular embodiments, the processor is further configured to route the first subsidiary request to the first API and first set of independent software services and the second subsidiary request to the second API and second set of independent software services in accordance with an adaptive swarm intelligence (ASI) algorithm. In particular embodiments, the processor may be further configured to detect an anomaly or a vulnerability associated with the queried API and the respective set of independent software services associated therewith and remediate the detected anomaly or vulnerability in accordance with a predetermined set of API governance policies.

In particular embodiments, the processor may be further configured to provide to the computing device a single response to the request, in which the single response includes the user data associated with the one or more of the plurality user profiles. In particular embodiments, the interaction with the software application may include a predetermined action. In particular embodiments, the processor may be further configured to execute the predetermined action by executing a blockchain-based smart contract to prevalidate the predetermined action in real-time or near real-time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
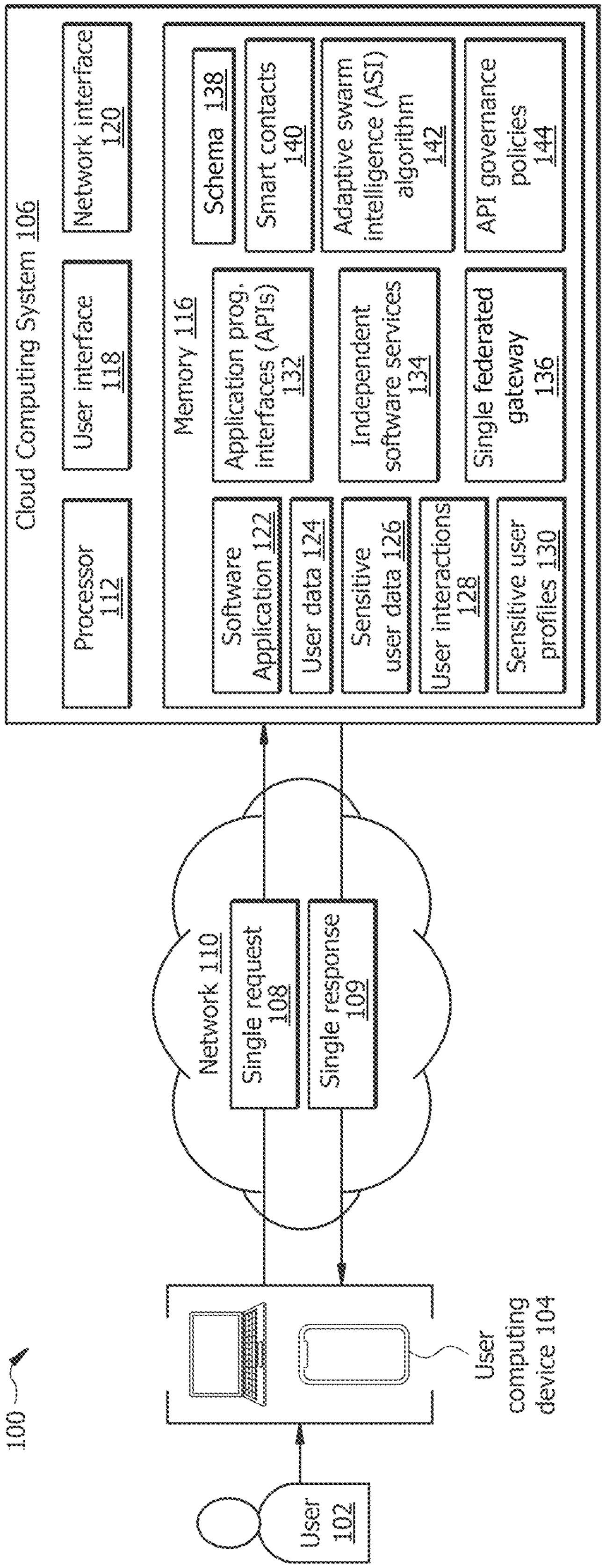
FIG. 1 is a block diagram of a cloud computing system, in accordance with certain aspects of the present disclosure.

FIG. 1 is a block diagram of a cloud computing system 100. In particular embodiments, the system 100 may include a user computing device 104 associated with a user 102, a cloud computing system 106, and a network 110. In particular embodiments, the user 102 may include a user associated with an institution, an organization, or an entity that receives user data (e.g., user data 124) and hosts and maintain sensitive user data (e.g., sensitive user data 126) that may be associated with the user 102. The network 110 enables communications and exchanges of data among components of the system 100, such as the user computing device 104 and the cloud computing system 106.

In general, the system 100 may be utilized to improve application programming interface (API) management, governance, and security utilizing a single federated gateway 136 and adaptive swarm intelligence (ASI) algorithm 142. In particular embodiments, the cloud computing system 106 may include one or more processor(s) 112 in signal communication with a memory 116. The memory 116 stores a software application 122 that when executed by the processor(s) 112, cause the processor(s) 112 to perform one or more functions described herein. For example, when the software application 122 is executed, the processor(s) 112 may receive, from the user computing device 104, a single request 108 to initiate an execution of one or more user interactions 128 with the software application 122 to satisfy the single request 108. The processor(s) 112 may then query, based on the single request 108, a single federated gateway 136 including a schema 138 of each of number of APIs 132 and a respective set of independent software services 134 associated therewith.

For example, querying the single federated gateway 136 may include querying one or more APIs 132 of the number of APIs 132 to be executed to facilitate the execution of the one or more user interactions 128 with the software application 122. The processor(s) 112 may then query execute, based on the queried one or more APIs 132, the single federated gateway 136. For example, the single federated gateway 136 is configured to route the single request 108 to the respective sets of independent software services 134 to initiate the execution of the one or more user interactions 128 with the software application 122. In response to the respective sets of independent software services 134 initiating the execution of the one or more user interactions 128 with the software application 122, the processor(s) 112 may provide to the user computing device 104 a single response 109 to the single request 108 based on the execution of the one or more user interactions 128 with the software application 122. The cloud computing system 100 may be configured as shown, or in any other configuration. In one embodiment, the cloud computing system 106 may include a private cloud computing and storage system, which may include, for example, a cloud computing environment and infrastructure that may be managed, controlled, and dedicated to a single organization or entity. In another embodiment, the cloud computing system 106 may include a hybrid cloud computing and storage system, which may include, for example, a mixed computing environment and infrastructure in which software applications are executing utilizing some combination of computing, storage, and services in both private cloud environments and public cloud environments. Still, in another embodiment, the cloud computing system 106 may include a public cloud computing and storage system, which may include, for example, a cloud computing environment and infrastructure that may be serviced to any number of organizations or entities as virtual resources accessible over the internet.

System Components

Network

The network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Cloud Computing System

In particular embodiments, the cloud computing system 106 may include any computing system that may be utilized to process data and communicate with computing devices (e.g., user computing device 104), databases, or other computing systems via the network 110. The cloud computing system 106 may be utilized to oversee operations of the processor(s) 112. In particular embodiments, the cloud computing system 106 may include the processor(s) 112 in signal communication with a network interface 120, a user interface 118, and memory 116. The cloud computing system 106 may be configured as shown, or in any other configuration.

The processor(s) 112 may include one or more processors operably coupled to the memory 116. The processor(s) 112 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor(s) 112 may be a programmable logic device, a microcontroller, a microprocessor, or any suitable combination of the preceding. The processor(s) 112 may be communicatively coupled to and in signal communication with the network interface 120, user interface 118, and memory 116. The one or more processors may be utilized to process data and may be implemented in hardware, software, or some combination thereof.

For example, the processor(s) 112 may be 8-bit, 16-bit, 32-bit, 64-bit or of any other suitable architecture. The processor(s) 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processor(s) 112 are configured to implement various instructions. For example, the one or more processors may be utilized to execute the software application 122 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

The network interface 120 may be utilized to enable wired and/or wireless communications (e.g., via the network 110). The network interface 120 may be utilized to communicate data between the cloud computing system 106 and other network devices, systems, or domain(s). For example, the network interface 120 may comprise a WIFI interface, a local area network (LAN) interface, a wide area network (WAN) interface, a modem, a switch, or a router. The processor(s) 112 may be configured to send and receive data using the network interface 120. The network interface 120 may be configured to use any suitable type of communication protocol.

The memory 116 may be volatile or non-volatile and may include a read-only memory (ROM), random-access memory (RAM), ternary content-addressable memory (TCAM), dynamic random-access memory (DRAM), and static random-access memory (SRAM), or other non-transitory computer-readable medium. The memory 116 may be implemented using one or more disks, tape drives, solid-state drives, and/or the like. As will be discussed in greater detail below with respect to FIG. 2, the memory 116 may be operable to store the software application 122, user data 124, sensitive user data 126, user interactions 128, sensitive user profiles 130, the number of APIs 132, the independent software services 134, single federated gateway 136, the schema 138, one or more blockchain-based smart contracts 140, an adaptive swarm intelligence (ASI) algorithm 142, API governance policies 144, and/or any other data, instructions, or compute engines.

The memory 116 may also store instances of software application 122 that may be executing within the system 100. In one embodiment, the instances of a software application 122 may include any number of instances a large software application suitable for hosting and servicing thousands or millions of individual users 102 that may interact via user computing devices 104 with the cloud computing system 106. The users 102 may be further associated with the sensitive user data 126.

Processor(s)

In particular embodiments, the processor(s) 112 may receive from the user computing device 104, a single request 108 to initiate an execution of one or more user interactions 128 with the software application 122 to satisfy the single request 108. The processor(s) 112 may then query, based on the single request 108, a single federated gateway 136 including a schema 138 of each of number of APIs 132 and a respective set of independent software services 134 associated therewith. For example, querying the single federated gateway 136 may include querying one or more APIs 132 of the number of APIs 132 to be executed to facilitate the execution of the one or more user interactions 128 with the software application 122.

In particular embodiments, the processor(s) 112 may then query execute, based on the queried one or more APIs 132, the single federated gateway 136. For example, the single federated gateway 136 is configured to route the single request 108 to the respective sets of independent software services 134 to initiate the execution of the one or more user interactions 128 with the software application 122. In response to the respective sets of independent software services 134 initiating the execution of the one or more user interactions 128 with the software application 122, the processor(s) 112 may provide to the user computing device 104 a single response 109 to the single request 108 based on the execution of the one or more user interactions 128 with the software application 122.

Thus, as will be discussed in further detail below with respect to FIGS. 2 and 3, in accordance with the presently disclosed embodiments, the processor(s) 112 may improve the security, reliability, and maintainability of the software application 122, services 134, and the sensitive user data 126, as well as the processor(s) 112 and memory 116 on which the software application 122, services 134, and the sensitive user data 126 may be executed and stored. Specifically, by providing a federated API gateway and governance and management system in which the single federated gateway 136 serves a single endpoint or a single entry point to a large number of APIs 132, the present embodiments may preclude any occurrence of redundant and duplicate APIs 132 each having their own independent and siloed security policies. Instead, the single federated gateway 136 implements a predetermined set of API governance policies 144, which manages, governs, and secures each of a large number of APIs 132 from a single endpoint, and thus increases software application 122 security and reduce processing workloads of the processor(s) 112.

Additionally, by the single federated gateway 136 gateway utilizing an adaptive swarm intelligence (ASI) algorithm 142 suitable for dynamically adapting data routes in accordance with changes to network data traffic and conditions, the present embodiments may reduce unnecessary calls or queries to the memory 116 into which sensitive user data 126 may be stored, and may thereby reduce memory 116 capacity and improve network 110 efficiency, bandwidth, and data throughput. Moreover, by the single federated gateway 136 monitoring each a large number of APIs 132 for anomalies or vulnerabilities and executing real-time or near real-time remediations of vulnerable APIs and/or the associated set of independent software services 134 (e.g., backend services), the present embodiments may in real-time or near real-time preclude potential cyberattacks to vulnerable APIs 132, and thereby increase software application 122 security.

Improving API Management, Governance, and Security Utilizing a Single Federated Gateway and Adaptive Swarm Intelligence Embodiments of the present disclosure discuss techniques for improving application programming interface (API) management, governance, and security utilizing a single federated gateway and adaptive swarm intelligence.

Figure 2:
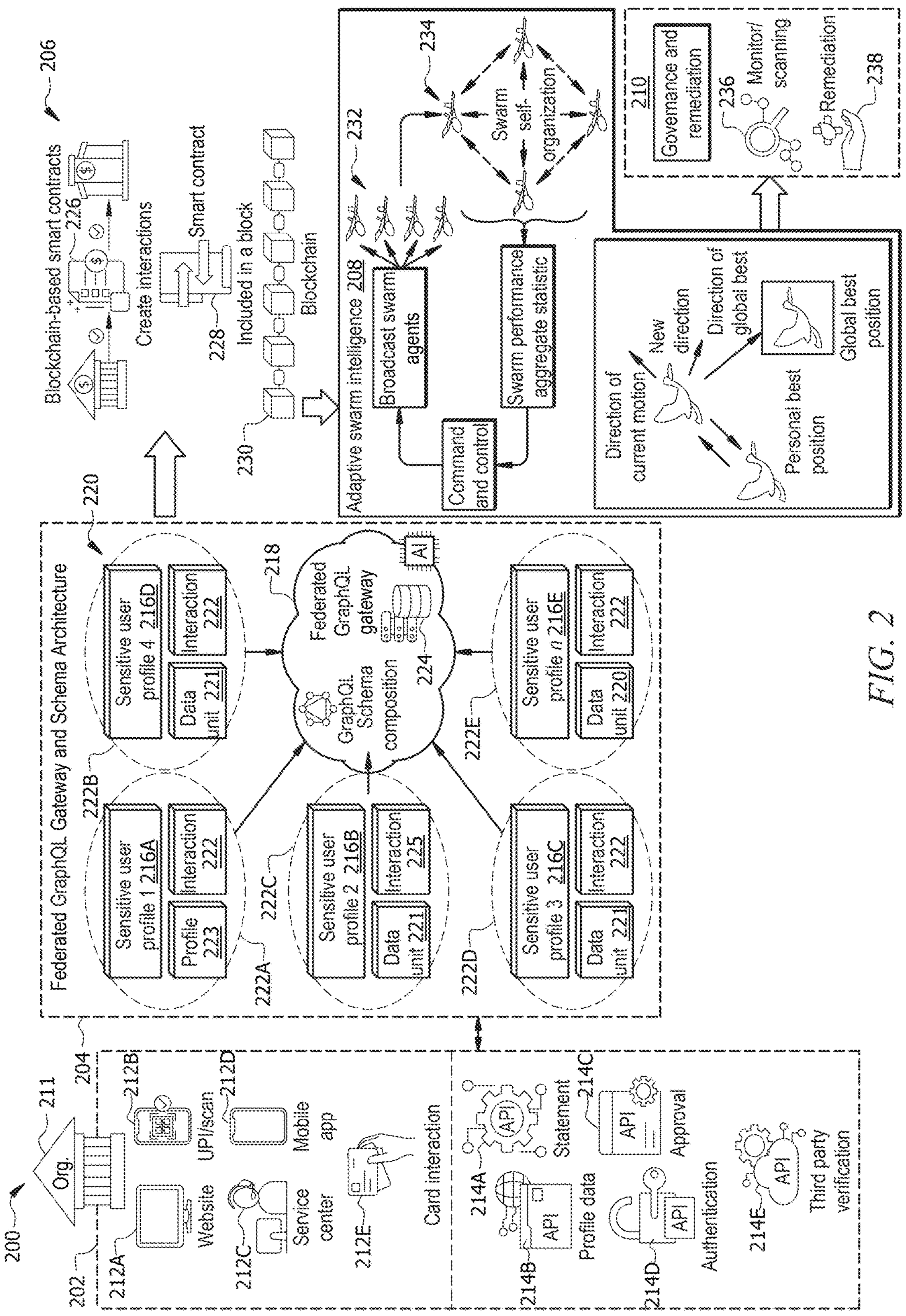
FIG. 2 illustrates an embodiment of a singular federated gateway application programming interface (API) governance and management architecture, in accordance with certain aspects of the present disclosure.

FIG. 2 illustrates an embodiment of a federated API gateway and governance and management architecture 200, in accordance with certain aspects of the present disclosure. In particular embodiments, the federated API gateway and governance and management architecture 200 may correspond to the cloud computing system 106 and may be executed by the processor(s) 112 as described above with respect to FIG. 1. As depicted, the single federated API gateway and governance and management architecture 200 may include a set of software services and APIs 202, a federated GraphQL gateway and schema 204, a blockchain based smart contracts system 206, an adaptive swarm intelligence (ASI) system 208, and a governance and remediation system 210.

As depicted, in particular embodiments, the set of software services and APIs 202 may include any number of frontend software services 212A (e.g., websites, webpages, user interfaces (UIs), menus, and so forth), 212B (e.g., unified payment interface (UPI) scan code, quick response (QR) codes, and so forth), 212C (e.g., customer service applications, videoconferencing applications, audioconferencing applications, and so forth), 212D (e.g., mobile applications ("apps"), widgets, user-customized services, and so forth), and 212E (e.g., physical card interactions, virtual card interactions) that may be associated with, and managed by, an organization 211 (e.g., a business entity, a data center) and further utilized by one or more users (e.g., user 102) to interact and engage with the organization 211.

As further depicted, the set of software services and APIs 202 may also include any number of APIs 214A, 214B, 214C, 214D, and 214E that may be utilized to interface and interconnect the frontend software services 212A to services, such as sensitive interaction applications, sensitive interaction logs, sensitive user profile data, user authentication data, third-party verification services, or other services that may be requested or utilized by one or more users (e.g., user 102) associated with the organization 211.

In particular embodiments, as further depicted by FIG. 2, the federated GraphQL gateway and schema 204 may include a single federated graph query language (GraphQL) gateway 218 and a schema 220. In particular embodiments, the single federated GraphQL gateway 218 may include a single GraphQL gateway (e.g., a single endpoint or a single entry point) to a large number of APIs 222A, 222B, 222C, 222D, and 222E (e.g., a large sprawl of APIs 222A, 222B, 222C, 222D, and 222E) that may be utilized to unify the large number of APIs and database 224 connections in a consistent and structured manner. Specifically, GraphQL may include a language to query a database 224, for example, and thus the single federated GraphQL gateway 218 may be suitable for serving as an API gateway because GraphQL provides a clear description of data in an API for frontend software services 212A, 212B, 212C, 212D, and 212E and allows for automatic translation of the description of data in an API for fetching, processing, and transferring by a respective set of independent software services (e.g., backend services, microservices).

For example, in accordance with the presently disclosed embodiments, the single federated GraphQL gateway 218 may generate a schema 220 of each of a large number of APIs 222A, 222B, 222C, 222D, and 222E and a respective set of independent software services (e.g., backend services, microservices) associated with each of the large number of APIs 222A, 222B, 222C, 222D, and 222E. For example, as depicted, the schema 220 may include map or graph structure linking, defining, and specifying each of the large number of APIs 222A, 222B, 222C, 222D, and 222E and each of their associated independent software services (e.g., backend services, microservices). For example, in one embodiment, the schema 220 may define and specify the format and available queries that a user (e.g., user 102) may submit to frontend software services 212A, 212B, 212C, 212D, and 212E. In a similar manner, the schema 220 may further define and specify the specific data key and values pairs and data fields that may be populated by the single federated GraphQL gateway 218 in the subsidiary requests to the independent software services (e.g., backend services, microservices) in response to the queries that a user (e.g., user 102) may submit to frontend software services 212A, 212B, 212C, 212D, and 212E, for example.

In particular embodiments, each respective set of independent software services (e.g., backend services, microservices) may maintain responsibility over its own data and services, but may be each managed and instructed by the single federated GraphQL gateway 218 by way of its corresponding API 222A-222E. In one embodiment, the API 222A may include independent software services, such as a sensitive user profile 216A, user profile data 223, and a user interaction 222. Similarly, the number of APIs 222B, 222C, 222D, and 222E may each include independent software services, such as a sensitive user profile 216B, a calculated data unit 221, and a user interaction 225.

In one embodiment, each of the sensitive user profiles 216A, 216B, 216C, 216D, and 216E may be associated with a same user (e.g., user 102), but may correspond to a disparate service that may be provided by the organization 211. Particularly, in accordance with the presently disclosed embodiments, the single federated GraphQL gateway 218 may allow a user (e.g., user 102) to input a single request or query (e.g., single request 108) utilizing frontend software services 212A, 212B, 212C, 212D, and 212E that may request data or services associated with any number of the large number of APIs 222A, 222B, 222C, 222D, and 222E and the respective set of independent software services 216, 221, 222 (e.g., backend services) associated therewith.

For example, in particular embodiments, in response to a single request or query that may be submitted by a user to frontend software services 212A, 212B, 212C, 212D, and 212E, the single federated GraphQL gateway 218 may then partition the single request or query (e.g., single request 108) into different subsidiary requests based on a content of the single request or query (e.g., single request 108). For example, an illustrative single request or query (e.g., single request 108) that may be inputted the user 102, for example, may be: "I would like to watch a favorite film of mine and also invite some friends to watch." In such a scenario, the single federated GraphQL gateway 218 partition the single request or query (e.g., single request 108) into subsidiary requests, such as "films;" "user's favorite films;" "invite some friends to watch."

In particular embodiments, the single federated GraphQL gateway 218 may then route each of the subsidiary requests to an appropriate API and a respective set of independent software services (e.g., backend services, microservices) suitable for fetching and transferring a subset of data responsive to the respective subsidiary request. For example, referring again to foregoing illustrative example, the single federated GraphQL gateway 218 may route the subsidiary request "films" to an API and associated independent software service associated with a digital streaming service, route the subsidiary request "user's favorite films" to an API and associated independent software service associated with a digital streaming service in which the user 102 has an active user profile, and further route the subsidiary request "invite some friends to watch" to an API and associated independent software service associated with a multimedia messaging service and user contacts list.

In particular embodiments, the APIs and associated independent software services may then fetch and transfer subsets of data responsive to the respective subsidiary requests. In particular embodiments, the single federated GraphQL gateway 218 may then aggregate the subsets of data fetched and transferred from the respective APIs and associated sets of independent software services into a single response (e.g., single response 109) and provide the single response (e.g., single response 109) to the single request or query (e.g., single request 108). For example, continuing with the illustrative example, the single federated GraphQL gateway 218 may aggregate the subsets of data responsive to the respective subsidiary requests and generate a single response (e.g., single response 109), such as "Here's your favorite film 'Sleek and Cool Jet Engines' streaming for free on 'TZTZT' streaming service and your friends 'Alice' and 'Bob' would like to watch."

In particular embodiments, as previously noted, and as further illustrated in FIG. 2, the federated API gateway and governance and management architecture 200 may include the blockchain-based smart contracts system 206, the adaptive swarm intelligence (ASI) system 208, and the governance and remediation system 210. In particular embodiments, in response to a single request or query (e.g., single request 108) for a particular interaction 226 to be handled by the organization 211, the single federated GraphQL gateway 218 may execute the particular interaction 226 by utilizing the blockchain-based smart contracts system 206 to execute a blockchain-based smart contract 228 (e.g., interaction terms executed as code running on a distributed ledger 230) to prevalidate the particular interaction 226 in real-time or near real-time and securely on the distributed ledger 230 (e.g., blockchain). Specifically, the blockchain-based smart contract 228 may provide a single source of truth for the particular interaction 226, and may thus ensure that the particular interaction 226 is recorded and tracked in a secure manner.

In particular embodiments, the single federated GraphQL gateway 218 may execute an adaptive swarm intelligence (ASI) algorithm to intelligently and efficiently route the single request or query (e.g., single request 108) to the appropriate one or more of the large number of APIs 222A, 222B, 222C, 222D, and 222E and the associated respective set of independent software services (e.g., backend services) in accordance with the presently disclosed embodiments. For example, in one embodiment, the adaptive swarm intelligence (ASI) algorithm may be suitable for intelligently and dynamically adapting data routes in accordance with changes to network 110 data traffic and conditions.

In particular embodiments, upon the single federated GraphQL gateway 218 preparing to route each of the subsidiary requests to an appropriate API and a respective set of independent software services (e.g., backend services, microservices), the single federated GraphQL gateway 218 an adaptive swarm intelligence (ASI) algorithm, which may include instantiating and deploying a number of autonomous agents 232 (e.g., "swarms" of artificial-intelligence (AI) compute agents) to independently monitor and track data flows associated with each of the appropriate APIs 222A, 222B, 222C, 222D, and 222E and respective associated independent software services. For example, in one embodiment, the number of autonomous agents 232 (e.g., "swarms" of artificial-intelligence (AI) compute agents) may include AI agents that may be suitable for emulating a decentralized and self-organized "swarm" behavior 234 (e.g., as observed in swarms like flocks of birds or ant colonies) in which each autonomous agent 232 acts independently to monitor and track monitor and track data flows associated with each of the appropriate APIs 222A, 222B, 222C, 222D, and 222E and respective associated independent software services, but further seek some form of synchronization (e.g., in terms of how often each autonomous agent 232 reports bandwidth, throughput, and response time metrics back to the single federated GraphQL gateway 218) with each other autonomous agent 232.

In one embodiment, based on their respective monitoring and tracking of the appropriate APIs 222A, 222B, 222C, 222D, and 222E and respective associated independent software services, the number of autonomous agents 232 (e.g., "swarms" of AI compute agents) may direct or redirect data traffic to one or more other suitable APIs and associated independent software services whenever appropriate. The ASI system 208 may thus allow the single federated GraphQL gateway 218 to fetch, process, and transfer high volumes of sensitive data across the large number of APIs 222A, 222B, 222C, 222D, and 222E efficiently and securely.

In particular embodiments, the governance and remediation system 210 may be utilized to monitor the large number of APIs 222A, 222B, 222C, 222D, and 222E for anomalies or vulnerabilities and execute real-time or near real-time remediations of vulnerable APIs and/or the respective set of independent software services (e.g., backend services) associated therewith in accordance with a predetermined set of API governance policies (e.g., API governance policies 144). An example of such an anomaly or vulnerability may include an unauthorized user attempting to access one or more of number of APIs 222A, 222B, 222C, 222D, and 222E, an authorized user interacting with one or more of number of APIs 222A, 222B, 222C, 222D, and 222E during the wee-hours of the day, an authorized user calling more than an N-number of APIs 222A, 222B, 222C, 222D, and 222E within predetermined time period, a sudden or unusual increase in data traffic on one or more of the number of APIs 222A, 222B, 222C, 222D, and 222E, a sudden or unusual decrease in response time of one or more of the number of APIs 222A, 222B, 222C, 222D, and 222E, and so forth.

In one embodiment, in response to the governance and remediation system 210 detecting such an anomaly or vulnerability associated with one or more of the large number of APIs 222A, 222B, 222C, 222D, and 222E, the governance and remediation system 210 may provide instructions for a self-remediation (e.g., a rebooting, an automatic termination of one or more tasks be performed, a pushing of a set of updates, and so forth) to be performed on the vulnerable APIs. In another embodiment, the governance and remediation system 210 may flag the vulnerable APIs for a patching by one or more software developers. For example, the governance and remediation system 210 may flag one or more vulnerable APIs 222A, 222B, 222C, 222D, and 222E as having to undergo a patching of its codebase, one or more associated plugins, and/or one or more drivers that may be associated with the one or more vulnerable APIs 222A, 222B, 222C, 222D, and 222E.

In particular embodiments, the predetermined set of API governance policies (e.g., API governance policies 144) may include any operating, usage, or storage policies that may be specified by the organization 211 in accordance with a desired governance, management, and security of the large number of APIs 222A, 222B, 222C, 222D, and 222E and the associated and the associated respective set of independent software services (e.g., backend services). Thus, in one embodiment, anomaly or vulnerability may include any condition in which any one of the large number of APIs 222A, 222B, 222C, 222D, and 222E and the associated respective set of independent software services (e.g., backend services) is in violation or partial violation of the predetermined set of API governance policies (e.g., API governance policies 144).

Figure 3:
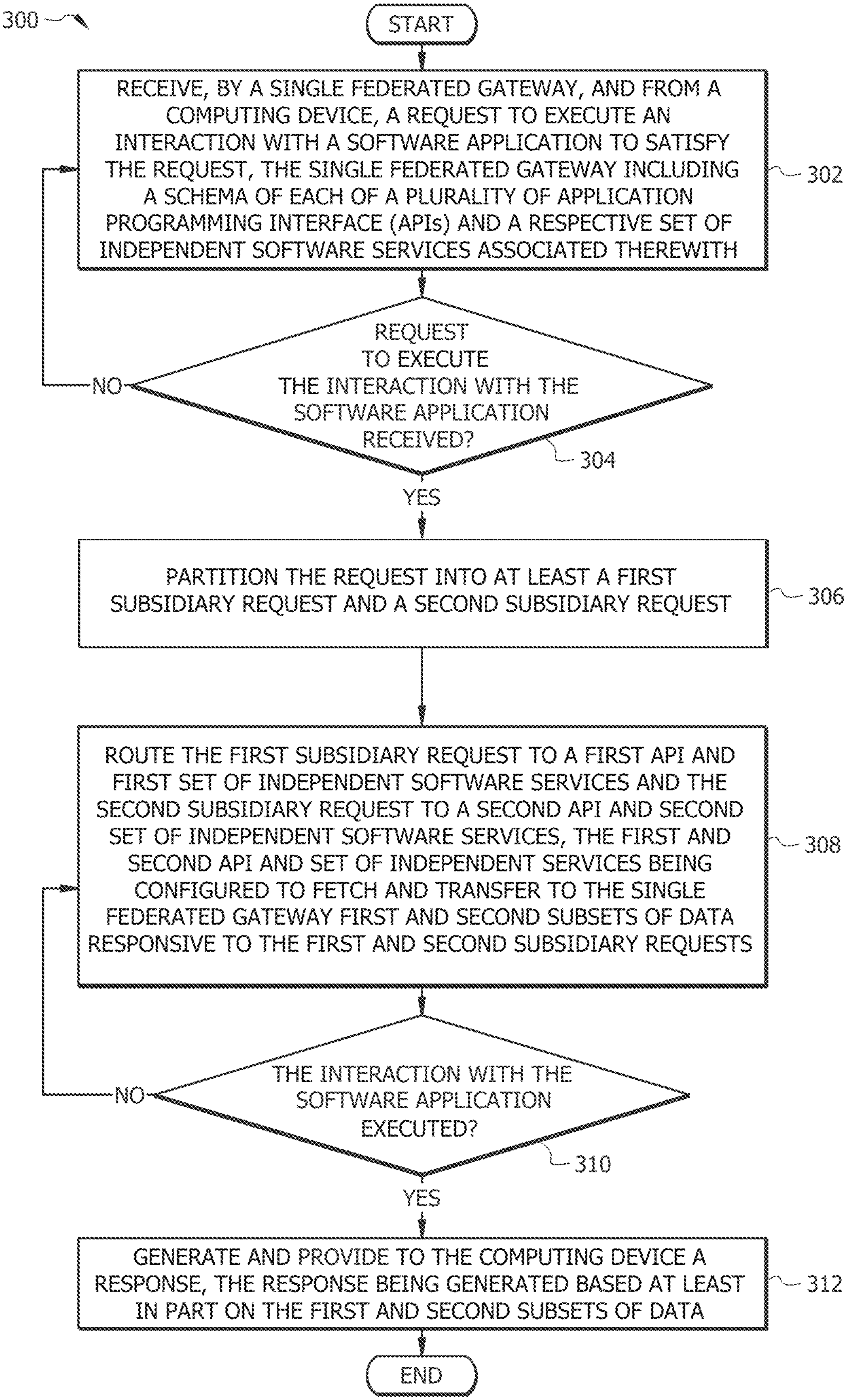
FIG. 3 illustrates a flowchart of an example method for improving API management, governance, and security utilizing a single federated gateway and adaptive swarm intelligence, in accordance with one or more embodiments of the present disclosure.

FIG. 3 illustrates a flowchart of an example method 300 for improving application programming interface (API) management, governance, and security utilizing a single federated gateway and adaptive swarm intelligence, in accordance with one or more embodiments of the present disclosure. The method 300 may be performed utilizing the one or more processor(s) 112 of cloud computing system 106 as described above with respect to FIG. 1. The method 300 may begin at block 302 with the processor(s) 112 receiving, by a single federated gateway 218, and from a computing device (e.g., user computing device 104), a request (e.g., single request 108) to execute an interaction (e.g., user interactions 128) with a software application (e.g., software application 122) to satisfy the request (e.g., single request 108). For example, in one embodiment, the software application (e.g., software application 122) may be associated with a plurality of application programming interfaces (APIs) 222A, 222B, 222C, 222D, and 222E. Each of the plurality of APIs 132 may include a set of independent software services 134 configured to fetch and process user data 124. In one embodiment, the single federated gateway 136 may include a schema 138 of each of the plurality of APIs 222A, 222B, 222C, 222D, and 222E and the respective set of independent software services 134 associated therewith.

The method 300 may then continue at decision 304 with the processor(s) 112 confirming whether the request (e.g., single request 108) to execute the interaction with the software application (e.g., software application 122) has been received. In one embodiment, in response to confirming that the request (e.g., single request 108) to execute the interaction with the software application (e.g., software application 122) has not been received (e.g., at decision 304), the method 300 may return to block 302 as discussed above.

On the other hand, in response to confirming that the request (e.g., single request 108) to execute the interaction with the software application (e.g., software application 122) has been received (e.g., at decision 304), the method 300 may then continue at block 306 with the processor(s) 112 partitioning the request (e.g., single request 108) into at least a first subsidiary request and a second subsidiary request based on a content of the request (e.g., single request 108). The method 300 may continue at block 308 with the processor(s) 112 routing the first subsidiary request to a first API (e.g., one of APIs 222A, 222B, 222C, 222D, and 222E) and first set of independent software services 134 and the second subsidiary request to a second API (e.g., one of APIs 222A, 222B, 222C, 222D, and 222E) and second set of independent software services 134.

For example, in one embodiment, the first API (e.g., one of APIs 222A, 222B, 222C, 222D, and 222E) and first set of independent software services 134 may be configured to fetch and transfer to the single federated gateway 218 a first subset of data responsive to the first subsidiary request. Similarly, the second API (e.g., one of APIs 222A, 222B, 222C, 222D, and 222E) and second set of independent software services 134 may be configured to fetch and transfer to the single federated gateway 218 a second subset of data responsive to the second subsidiary request.

The method 300 may then continue at decision 310 with the processor(s) 112 confirming whether the interaction with the software application (e.g., software application 122) has been executed. In one embodiment, in response to confirming that the interaction with the software application (e.g., software application 122) has not been executed (e.g., at decision 304), the method 300 may return to block 308 as discussed above. On the other hand, in response to confirming that the interaction with the software application (e.g., software application 122) has been executed (e.g., at decision 310), the method 300 may then conclude at block 312 with the processor(s) 112 generating and providing to the computing device (e.g., user computing device 104) a response (e.g., single response 109) to the request (e.g., single request 108) based on the execution of the interaction with the software application (e.g., software application 122). For example, in particular embodiments, the single federated gateway 218 may generate the response (e.g., single response 109) based on the first subset of data responsive to the first subsidiary request and the second subset of data responsive to the second subsidiary request.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a memory configured to store a software application and a plurality of application programming interfaces (APIs) associated with the software application, wherein each of the plurality of APIs comprises a set of independent software services configured to fetch and process user data; and a processor operably coupled to the memory and configured to:

receive, by a single federated gateway, and from a computing device, a request to execute an interaction with the software application to satisfy the request, wherein the single federated gateway includes a schema of each of the plurality of APIs and the respective set of independent software services associated therewith;

partition the request into at least a first subsidiary request and a second subsidiary request based on a content of the request;

route the first subsidiary request to a first API and first set of independent software services and the second subsidiary request to a second API and second set of independent software services, wherein the first API and first set of independent software services is configured to fetch and transfer to the single federated gateway a first subset of data responsive to the first subsidiary request, and wherein the second API and second set of independent software services is configured to fetch and transfer to the single federated gateway a second subset of data responsive to the second subsidiary request;

receive, by the single federated gateway, and from the first API and first set of independent software services and the second API and second set of independent software services, the first subset of data and the second subset of data;

generate, based at least in part on the first subset of data and the second set of data, a response to the request to execute the interaction with the software application; and in response to the execution of the interaction with the software application, provide to the computing device the response.

2. The system of claim 1, wherein the plurality of APIs comprises a sprawl of APIs each corresponding to one or more disparate software services, and wherein each software service is configured to fetch and process user data associated with one or more of a plurality user profiles associated with at least one user.

3. The system of claim 2, wherein the processor is further configured to provide to the computing device a single response to the request, and wherein the single response comprises the user data associated with the one or more of the plurality user profiles.

4. The system of claim 1, wherein the single federated gateway comprises a single graph query language (GraphQL) API gateway.

5. The system of claim 1, wherein the processor is further configured to route the first subsidiary request to the first API and first set of independent software services and the second subsidiary request to the second API and second set of independent software services in accordance with an adaptive swarm intelligence (ASI) algorithm.

6. The system of claim 1, wherein the processor is further configured to:

detect an anomaly or a vulnerability associated with at least one API of the plurality of APIs; and remediate the detected anomaly or vulnerability in accordance with a predetermined set of API governance policies.

7. The system of claim 1, wherein the interaction with the software application comprises a predetermined action, and wherein the processor is further configured to execute the predetermined action by executing a blockchain-based smart contract to prevalidate the predetermined action in real-time or near real-time.

8. A method, comprising:

receiving, by a single federated gateway, and from a computing device, a request to execute an interaction with a software application to satisfy the request, wherein the software application is associated with a plurality of application programming interfaces (APIs), wherein each of the plurality of APIs comprises a set of independent software services configured to fetch and process user data, and wherein the single federated gateway includes a schema of each of the plurality of APIs and the respective set of independent software services associated therewith;

partitioning the request into at least a first subsidiary request and a second subsidiary request based on a content of the request;

routing the first subsidiary request to a first API and first set of independent software services and the second subsidiary request to a second API and second set of independent software services, wherein the first API and first set of independent software services is configured to fetch and transfer to the single federated gateway a first subset of data responsive to the first subsidiary request, and wherein the second API and second set of independent software services is configured to fetch and transfer to the single federated gateway a second subset of data responsive to the second subsidiary request;

receiving, by the single federated gateway, and from the first API and first set of independent software services and the second API and second set of independent software services, the first subset of data and the second subset of data;

generating, based at least in part on the first subset of data and the second set of data, a response to the request to execute the interaction with the software application; and in response to the execution of the interaction with the software application, providing to the computing device the response.

9. The method of claim 8, wherein the plurality of APIs comprises a sprawl of APIs each corresponding to one or more disparate software services, and wherein each software service is configured to fetch and process user data associated with one or more of a plurality user profiles associated with at least one user.

10. The method of claim 9, further comprising providing to the computing device a single response to the request, and wherein the single response comprises the user data associated with the one or more of the plurality user profiles.

11. The method of claim 8, wherein the single federated gateway comprises a single graph query language (GraphQL) API gateway.

12. The method of claim 8, further comprising routing the first subsidiary request to the first API and first set of independent software services and the second subsidiary request to the second API and second set of independent software services in accordance with an adaptive swarm intelligence (ASI) algorithm.

13. The method of claim 8, further comprising:

detecting an anomaly or a vulnerability associated with at least one API of the plurality of APIs; and remediating the detected anomaly or vulnerability in accordance with a predetermined set of API governance policies.

14. The method of claim 8, wherein the interaction with the software application comprises a predetermined action, the method further comprising executing the predetermined action by executing a blockchain-based smart contract to prevalidate the predetermined action in real-time or near real-time.

15. A non-transitory computer-readable medium storing instructions that, when executed by one or more processors, cause the one or more processors to:

receive, by a single federated gateway, and from a computing device, a request to execute an interaction with a software application to satisfy the request, wherein the software application is associated with a plurality of application programming interfaces (APIs), wherein each of the plurality of APIs comprises a set of independent software services configured to fetch and process user data, and wherein the single federated gateway includes a schema of each of the plurality of APIs and the respective set of independent software services associated therewith;

partition the request into at least a first subsidiary request and a second subsidiary request based on a content of the request;

route the first subsidiary request to a first API and first set of independent software services and the second subsidiary request to a second API and second set of independent software services, wherein the first API and first set of independent software services is configured to fetch and transfer to the single federated gateway a first subset of data responsive to the first subsidiary request, and wherein the second API and second set of independent software services is configured to fetch and transfer to the single federated gateway a second subset of data responsive to the second subsidiary request;

receive, by the single federated gateway, and from the first API and first set of independent software services and the second API and second set of independent software services, the first subset of data and the second subset of data;

generate, based at least in part on the first subset of data and the second set of data, a response to the request to execute the interaction with the software application; and in response to the execution of the interaction with the software application, provide to the computing device the response.

16. The non-transitory computer-readable medium of claim 15, wherein the plurality of APIs comprises a sprawl of APIs each corresponding to one or more disparate software services, and wherein each software service is configured to fetch and process user data associated with one or more of a plurality user profiles associated with at least one user.

17. The non-transitory computer-readable medium of claim 16, wherein the instructions further cause the one or more processors to provide to the computing device a single response to the request, and wherein the single response comprises user data associated with the one or more of the plurality user profiles.

18. The non-transitory computer-readable medium of claim 15, wherein the single federated gateway comprises a single graph query language (GraphQL) API gateway.

19. The non-transitory computer-readable medium of claim 15, wherein the instructions further cause the one or more processors to route the first subsidiary request to the first API and first set of independent software services and the second subsidiary request to the second API and second set of independent software services in accordance with an adaptive swarm intelligence (ASI) algorithm.

20. The non-transitory computer-readable medium of claim 15, wherein the instructions further cause the one or more processors to:

detect an anomaly or a vulnerability associated with at least one API of the plurality of APIs; and remediate the detected anomaly or vulnerability in accordance with a predetermined set of API governance policies.

* * * * *